United States Patent [19]

Moeller et al.

[11] Patent Number: 4,596,585
[45] Date of Patent: Jun. 24, 1986

[54] METHOD AND APPARATUS FOR REDUCTION OF RADON DECAY PRODUCT EXPOSURE

[76] Inventors: Dade W. Moeller, 27 Wildwood Dr., Bedford, Mass. 01730; Stephen N. Rudnick, 33 George St., Newton, Mass. 02158; Edward F. Maher, USAF OEHL/RZN, Brooks AFB, Tex. 78235

[21] Appl. No.: 585,993

[22] Filed: Mar. 5, 1984

[51] Int. Cl.$^4$ ........................... B03C 3/41; B03C 3/86
[52] U.S. Cl. .......................................... 55/2; 55/101; 55/385 A; 422/121
[58] Field of Search ..................... 55/2, 6, 101, 385 A; 361/225, 230, 235, 213, 216; 250/423 R; 416/146 R; 422/121

[56] References Cited

U.S. PATENT DOCUMENTS

| | | | |
|---|---|---|---|
| 1,925,243 | 9/1933 | Golden | 361/230 |
| 1,994,462 | 3/1935 | Bueno | 204/32 |
| 2,744,865 | 5/1956 | Penning | 204/319 |
| 3,308,344 | 3/1969 | Smith et al. | 361/213 |
| 3,370,403 | 2/1968 | D'Elia et al. | 55/106 |
| 3,417,302 | 12/1968 | Lueder | 361/235 |
| 3,422,263 | 1/1969 | Asahina | 416/146 R |
| 3,438,136 | 4/1969 | Raymond | 34/72 |
| 3,672,126 | 6/1972 | Goettle | 55/106 |
| 3,744,216 | 7/1973 | Halloran | 55/102 |
| 4,376,642 | 3/1983 | Verity | 55/105 |
| 4,422,824 | 12/1983 | Eisenhardt, Jr. | 55/385 A |
| 4,447,761 | 5/1984 | Stinnett | 250/423 R |

OTHER PUBLICATIONS

Yaglou, C. P., "Are Air Ions a Neglected Biological Factor?," pp. 269–279, in *The Air We Breathe–A Study of Man and His Environment,* Farber, S. M., and Wilson, R. H. L. (Editors), Charles C. Thomas, Publisher, Springfield, IL (1961).

"Natural Radiation Exposure in the United States", U.S. Environmental Agency, by Donald T. Oakley, Jun. 1972.

"Natural Radiation in the Urban Environment", by Yeates et al., *Nuclear Safety,* vol. 13, No. 4, Jul.–Aug. 1972.

Moeller, D. W., Underhill, D. W., and Gulezian, G. V., "Population Dose Equivalent from Naturally Occurring Radionuclides in Building Materials," in *Proceedings of the Natural Radiation Environment III,* Houston, TX (Apr. 23–28, 1978). Report CONF-780422, vol. 2, pp. 1424–1443, U.S. Department of Energy, Washington, DC (1980).

"Cost Evaluation of Control Measures for Indoor Radon Progeny", by Moeller et al., (7/81–9/82).

Hinds, W. C.; Rudnick, S. N.; Maher, E. F. and First, M. W.; "Control of Indoor Radon Decay Products by Air Treatment Devices", *Journal of the Air Pollution Control Association,* vol. 33, No. 2, pp. 134–136 (Feb. 1983).

"Surface Deposition of Radon Decay Products with and without Enhanced Air Motion", by Rudnick et al., 17th DOE Nuclear Air Cleaning Conference.

(List continued on next page.)

*Primary Examiner*—David L. Lacey
*Attorney, Agent, or Firm*—Hamilton, Brook, Smith & Reynolds

[57] ABSTRACT

An economical method and apparatus for the removal of airborne radon decay products from indoor environments comprising the circulation of air in the environment with a fan concurrent with generation of ions from an ion generator to create a spatial distribution of airborne charged ions and an electric field gradient which is radially directed from the ion generator. The turbulent convection of air caused by the air circulation allows the radon decay products and particles to which they attach to become more rapidly charged and facilitates molecular diffusion of the particles and radon decay products to nearby surfaces. The electric field gradient causes migration of charged attached or unattached radon decay products toward the walls of an indoor environment whereby they deposit and are removed from the airspace.

10 Claims, 5 Drawing Figures

OTHER PUBLICATIONS

"On the Effect of a Negative Ion-Generator and a Mixing Fan on the Plate-Out of Radon Decay Products in a Radon Box", by J. Bigu, *Health Physics*, vol. 44 (Mar.) pp. 259–266, 1983.

Research Proposal, "Studies on the Sampling, Evaluation, and Control of Naturally Occurring Airborne Radionuclides in Homes Built on Florida Phosphate Lands", submitted to Florida Institute of Phosphate Research, 4/24/81, by D. W. Moeller.

"Testing of Air Cleaning Devices to Determine Their Capabilities to Reduce Radon Progeny Concentrations in Homes", by Lloyd et al., Sep. 1981, Montana Dept. of Health and Environmental Sciences.

"Indoor Pollutants", National Academy Press, 1981.

"Choosing Populations to Study the Health Effects of Low-Dose Ionizing Radiation", by Dreyer et al., *American Journal of Public Health*, Nov. 1981, vol. 71, No. 11.

"Energy-Saving May Enhance Indoor Hazards", by Denise Goodman, *Boston Sunday Globe*, Mar. 22, 1982.

"Attempts at Aerosol Control in a Turkey Rearing Confinement with Negative Air Ionization", by Parker et al., *Am. Ind. Hyg. Assoc. J.*, 44(12) 911–915 (1983).

Rock, R. L.; "Control of Radon Daughters in U.S. Underground Uranium Mines", *Proceedings of the 12th AEC Air Cleaning Conference*, Report CONF-720823, vol. 1, U.S. Atomic Energy Commission, Washington, D.C. (Jan. 1973).

Goodwin, A.; "Review of Problems and Techniques for Removal of Radon and Radon Daughter Products from Mine Atmospheres", *Proceedings of the 12 AEC Air Cleaning Conference*, Report CONF-720823, vol. 1, U.S. Atomic Energy Commission, Washington, DC (Jan. 1973).

Washington, R. A.; Chi, W.; and Regan, R.; "The Use of Vermiculite to Control Dust and Radon Daughters in Underground Uranium Mine Air", *Proceedings of the 12th AEC Air Cleaning Conference*, Report CONF-720823, vol. 1, U.S. Atomic Energy Commission, Washington, DC (Jan. 1973).

Shreve, J. D. and Cleveland, J. E.; "Effects of Depressing Attachment Ratio of Radon Daughters in Uranium Mine Atmosphere", *Am. Ind. Hyg. Assoc. J.*, vol. 33, No. 4, p. 304 (1972).

Fitzgerald, J. E., Jr.; Guimond, R. J.; and Shaw, R. A.; "A Preliminary Evaluation of the Control of Indoor Radon Daughter Levels in New Structures", U.S. Environmental Protection Agency, EPA-520/4-76-108, Washington, DC (Nov. 1976).

Windham, S. T.; Savage, E. D.; and Phillips, C. R.; "The Effects of Home Ventilation Systems on Indoor Radon-Radon Daughter Levels", U.S. Environmental Protection Agency, EPA-520/5-77-011, Washington, DC (Oct. 1978).

Holub, R. F.; Droullard, R. F.; Ho, W.; Hopke, P. K.; Parsley, R.; and Stuckel, J. J.; "The Reduction of Airborne Radon Daughter Concentration by Plateout on an Air Mixing Fan", *Health Physics*, vol. 36, No. 4, p. 497 (1979).

Rudnick, S. N.; Hinds, W. C.; Maher, E. F.; Price, J. M.; Fugimoto, K.; Gu, F. and First, M. W.; "Effects of Indoor Air Circulation Systems on Radon Decay Product Concentrations", Final Report on USEPA Contract No. 68-01-6050, Feb. 1982, U.S. Environmental Protection Agency, Wash., DC.

Intakes of Radionuclides by Workers, Part 1", *Annals of ICRP*, 2, pp. 23–29, Pergamon Press, Oxford, (1979).

Jacobi, W. and Eisfeld, K. "Dose to Tissues and Effective Dose Equivalent by Inhalation of Radon-222, Radon-220 and Their Short-Lived Daughters", GSF--S-626, Munich, Germany (1980).

A. C. James, Dosimetric Approaches to Risk Assessment for Indoor Exposure to Radon Daughters, Radiation Protection Dosimetry, vol. 7, No. 1–4, pp. 353–356, 1984.

A. C. James et al., Is Exposure to Potential Alpha Energy an Adequate Index of Dose?, Radiological Protection Bulletin, No. 50, pp. 5–13 (Jan. 1983).

U.S. Patent  Jun. 24, 1986  Sheet 1 of 2  4,596,585
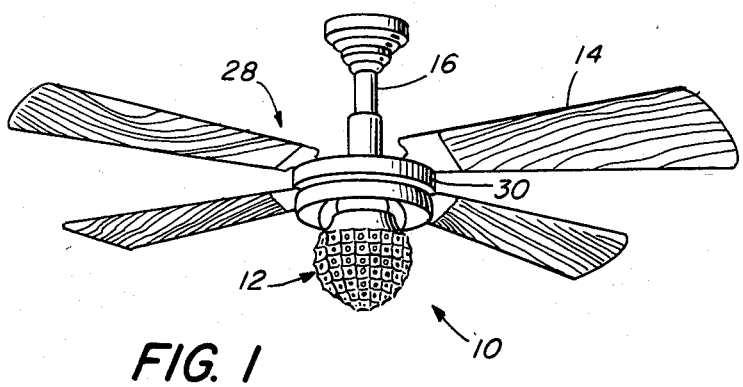
FIG. 1
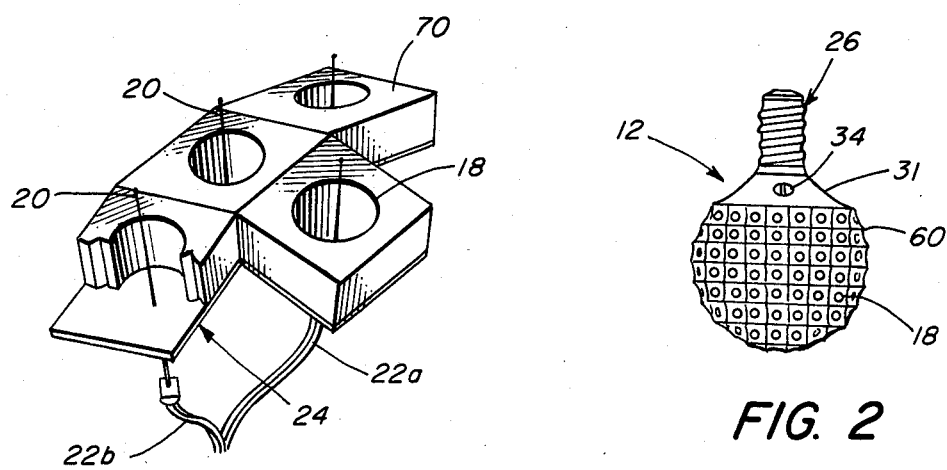
FIG. 3
FIG. 2

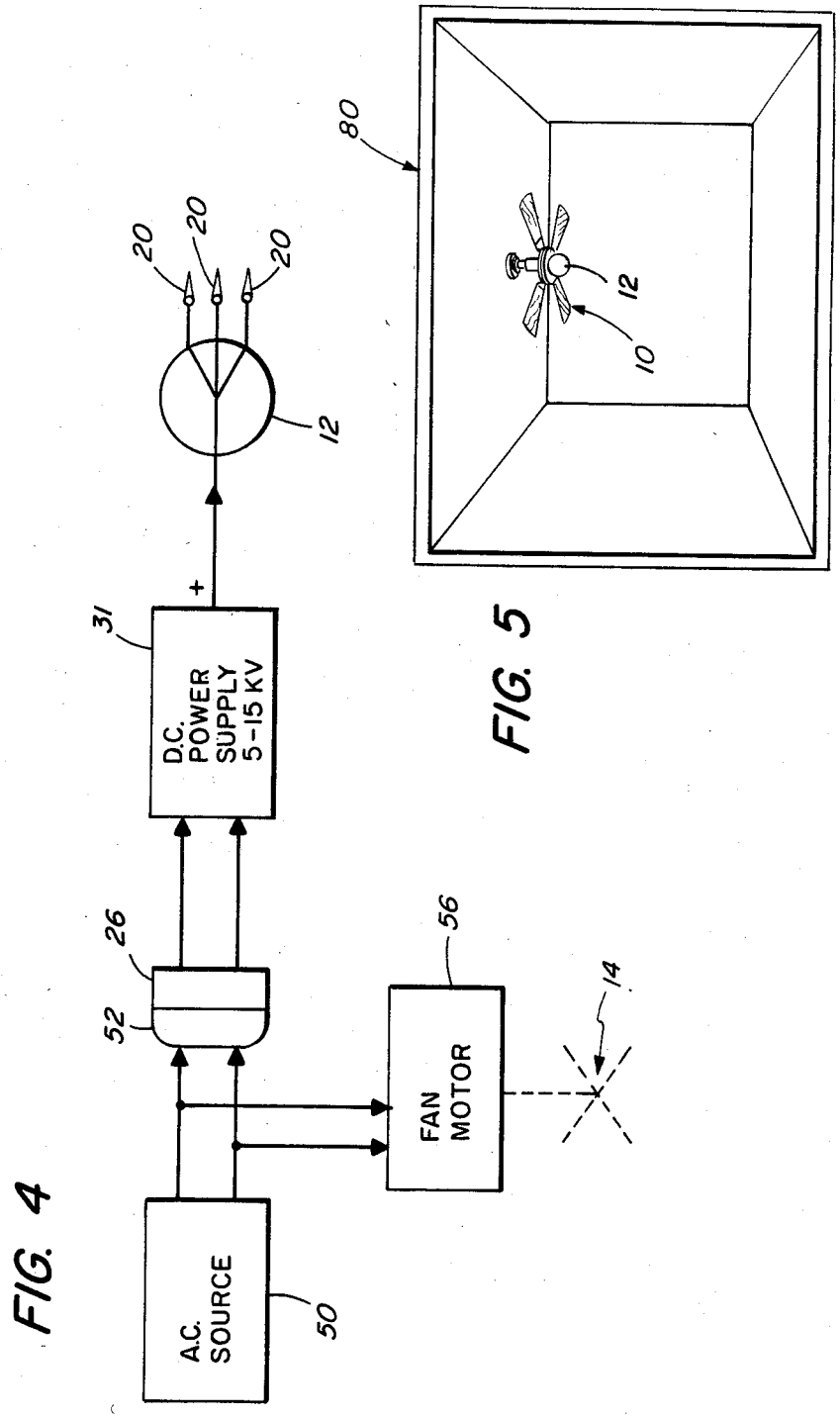

METHOD AND APPARATUS FOR REDUCTION OF RADON DECAY PRODUCT EXPOSURE

TECHNICAL FIELD

This invention relates to a method and apparatus for reducing the amount of airborne radionuclides where people live or work.

BACKGROUND ART

The greatest source of ionizing radiation exposure to the general public today is from naturally occurring airborne radionuclides inside residences. The majority of the natural radioactive material found in the indoor environment is due to the primordial radionuclide, uranium-238, and its associated decay series members. The series member of primary concern is radon-222, a gaseous radioactive pollutant that can accumulate in the air within dwellings, particularly those with low outside air infiltration rates. The immediate precursor of radon-222 is radium-226 which, because of its 1600 year half-life, serves as a virtually continuous source of radon-222 production within residences. All substances of natural origin, such as water, rock, soil, and construction materials which incorporate crustal materials as aggregate, contain some amount of radium-226. The radioactive decay of radium-226 produces the inert radioactive gas, radon, which is then free to diffuse through porous soils and construction materials and eventually to enter the environment within a building. Once inside a dwelling, radon will eventually decay (half life=3.8 days) to initiate what is commonly referred to as the short-lived radon decay product series. This series consists of heavy metal atoms of polonium, lead, and bismuth, each of which is, in turn, radioactive and possesses very short half-lives (i.e., 30 minutes or less). The principal radionuclides in the decay chain are as follows: Rn-222 (radon) decays to Po-218 (RaA) which decays to Pb-214 (RaB) which decays to Bi-214 (RaC), which decays to Po-214(RaC'), which decays to long-lived Pb-210 (RaD).

The airborne radioactive decay products in this series frequently collide with and attach themselves to large dust particles within the air inside a dwelling. The effective size of such attached decay products ranges from 0.05 to a few micrometers in diameter. Depending on the concentration of dust in the room air, up to 20% of the decay products will not attach to dust particles and will remain in a free ion state. Since unattached decay products are often positively charged, they tend to attract other small polar molecules in the air, such as water vapor and trace gases, and are believed to exist, at least temporarily, as very small and highly diffusive ion clusters.

The health hazard associated with the radon decay series stems from the inhalation by humans of both the attached and unattached decay products, and their eventual decay and irradiation of susceptible lung cell populations. Epidemiological studies on uranium miners have demonstrated a causal relationship between the inhalation of high concentrations of radon decay products and an increased risk of lung cancer. The radiobiological consequence of the attachment state of the decay product being inhaled stems from the knowledge that highly diffusive unattached decay product atoms preferentially deposit in the upper segments of the tracheo-bronchial tree of the lungs. This is the site within the lungs where most of the cancers among the uranium miners have occurred. As a result, the unattached decay products are believed to have the potentiality of causing a higher localized lung dose equivalent (and therefore have a higher associated risk) per unit amount of radioactive material inhaled. In contrast, the large attached decay products are deposited rather uniformly throughout the respiratory system, and are considered by radiobiologists to impose a much lesser risk of health damage (cancer) on the exposed individual.

Attempts to remedy the problem of radon decay product exposure fall into two categories: (1) control techniques applied to mine atmospheres and (2) theoretical and limited experimental studies applied to radon and radon decay products in buildings. Control strategies also fall into two basic categories: (1) the prevention of radon gas buildup inside a structure (mine or building), either by providing a barrier to prevent the radon from entering or by selecting foundation and construction materials that are relatively low in their naturally occurring radionuclide content, and (2) the removal of radon decay products from the interior air. As stated above, airborne decay products can exist as either free species or attached to aerosol particles, and different control strategies have been devised for each case.

The traditional method for the control of radon decay products in uranium mines has been mechanical ventilation, and maximum permissible concentrations for such products have been expressed in terms of Working Level (WL)[1]. Significant decreases in radon decay product concentrations have been accomplished by recirculating large volumes of air within a mine shaft, without introducing makeup air. Decreases in working levels by factors of 10 to 20 using recirculation rates of 20 and 60 per hour have been reported. The large recirculation rates apparently caused radon decay product removal by both increased deposition on mine surfaces of decay products attached to aerosol particles and increased diffusion of unattached decay products to mine surfaces.

[1] The Working Level (WL) is defined as any combination of short-lived radon decay products, i.e., RaA, RaB, and RaC, per liter of air that upon complete decay will release $1.3 \times 10^5$ MeV of alpha energy. The most common unit for expressing the time-integrated exposure to the short-lived decay products is the Working Level Month (WLM). Exposure to an atmospheric concentration of one WL for 170 hours (one working month) is defined as a cumulative exposure of 1 WLM.

Both filtration and electrostatic precipitation have also been used for radon decay product removal in mines. [Rock, R. L.; "Control of Radon Daughters in U.S. Underground Uranium Mines", *Proceedings of the 12th AEC Air Cleaning Conference*, Report CONF-720823, Vol. 1, U.S. Atomic Energy Commission, Washington, DC (Jan. 1973); Goodwin, A.; "Review of Problems and Techniques for Removal of Radon and Radon Daughter Products from Mine Atmospheres", *Proceedings of the 12th AEC Air Cleaning Conference*, Report CONF-720823, Vol. 1, U.S. Atomic Energy Commission, Washington, DC (Jan. 1973); Washington, R. A.; Chi, W.; and Regan, R.; "The Use of Vermiculite to Control Dust and Radon Daughters in Underground Uranium Mine Air", *Proceedings of the 12th AEC Air Cleaning Conference*, Report CONF-720823, Vol. 1, U.S. Atomic Energy Commission, Washington, DC (Jan. 1973); Shreve, J. D. and Cleveland, J. E.; "Effects of Depressing Attachment Ratio of Radon Daughters in Uranium Mine Atmosphere", *Am. Ind. Hyg. Assoc. J.*, Vol. 33, No. 4, p. 304 (1972).] For example, Washington et al., (referenced above) reported that use of a deep bed of vermiculite particles as a filter reduced radon decay product levels by 20%–40%, depending on bed configuration and filtration velocity.

Shreve and Cleveland (also referenced above) used high efficiency particulate air (HEPA) filters in an attempt to improve upon the results previously attained with medium-to-low efficiency filters. They measured decreases of 40%–70% in RaA concentrations and 10%–70% in RaC concentrations at various distances downstream from the filter.

Most of the air ceaning devices developed for mines are not directly applicable to the control of radon decay products in residences because of large differences in scale.

Fitzgerald et al. [Fitzgerald, J. E., Jr.; Guimond, R. J.; and Shaw, R. A.; "A Preliminary Evaluation of the Control of Indoor Radon Daughter Levels in New Structures", U.S. Environmental Protection Agency, EPA-520/4-76-018, Washington, DC (Nov. 1976)] conducted an evaluation of measures suitable for controlling radon exhalation through foundations of buildings. They compared the cost effectiveness of four alternative control technologies: polymeric sealants, excavation, crawl space construction, and ventilation. Measures to remove radon decay products once they have penetrated into a structure were grouped together by Fitzgerald et al., and considered under the category "effective ventilation." They defined "effective ventilation" as the replacement of air within a structure with air containing outdoor radon concentrations by natural infiltration or by recycling of air within a structure through an air cleaner. These authors considered the following types of "effective ventilation": (1) increased natural ventilation (2) filtration, (3) electrostatic precipitation, and (4) combined electrostatic precipitation and outside air exchange. Because they could find no data on the ability of air cleaners to reduce radon decay product concentrations, they used typical air cleaner characteristics to model their performance.

The models assumed that natural ventilation was equivalent to 1.0 air change per hour (1 $h^{-1}$). Since this level of natural ventilation has a large effect on the concentrations of radon and its decay products, the addition of "effective ventilation" rates of 1 to 2 $h^{-1}$ was found to have relatively little additional effect. When the energy usage and periodic maintenance requirements of effective ventilation practices were combined with their relatively poor incremental decay product removal efficiency, their cost effectiveness was found to be poorer than the other alternatives studied.

A report by Windham et al. [Windham, S. T.; Savage, E. D.; and Phillips, C. R.; "The Effects of Home Ventilation Systems on Indoor Radon-Radon Daughter Levels", U.S. Environmental Protection Agency, EPA-520/5-77-011, Washington, DC (Oct. 1978)], summarizes the results of an experimental program to measure the effects of ventilation on radon and radon decay products in an unoccupied single family house located on reclaimed phosphate land in Polk County, Florida. Measurements were made of the effects on radon and its decay product concentrations of using a central air conditioner, central blower without air conditioning, and outside air ventilation.

These experiments indicated that all three control techniques significantly decreased radon and radon decay products levels below those measured when the house was sealed and allowed to reach a steady state. Each technique caused the WL to decrease by a factor of about ten.

The sealed house had a natural ventilation rate (infiltration) of 0.5–0.6 air changes per hour ($h^{-1}$) running the air conditioner or central fan increased this to 2.0–2.5 $h^{-1}$, whereas using a window fan to introduce outside ventilation resulted in a ventilation rate of 5.4 $h^{-1}$. The authors concluded that the decrease in WL measured for all three techniques was probably caused in each case by the increased ventilation rate. They did not believe that factors such as filtration by the air conditioner filter or plate-out on the various surfaces in the house contributed significantly to the WL reduction, but no data were collected to confirm this opinion.

Holub et al. [Holub, R. F.; Droullard, R. F.; Ho, W.; Hopke, P. K.; Parsley, R.; and Stukel, J. J.; "The Reduction of Airborne Radon Daughter Concentration by Plateout on an Air Mixing Fan", Health Physics, Vol. 36, No. 4, p. 497 (1979)] introduced radon into a test chamber and measured the effects of an air mixing fan on radon decay product concentrations. They found that the operation of the fan decreased radon decay product levels in the air by a factor of about two. The initial hypothesis was that the air motion would cause the radon decay products to plate-out on the walls of the chamber, causing the observed decrease in air concentrations. They found, however, that the decrease in concentration was due entirely to deposition on the fan blades themselves rather than on the walls.

The use of turbulent convection (air mixing fans) has been reported by Rudnick et al. (Rudnick, S. N.; Hinds, W. C.; Maher, E. F.; Price, J. M.; Fugimoto, K.; Gu, F. and First, M. W.; "Effects of Indoor Air Circulation Systems on Radon Decay Product Concentrations", Final Report on USEPA Contract Number 68-01-6050, February 1982, U.S. Environmental Protection Agency, Washington, D.C.) as effective in removing airborne unattached decay products which typically have diameters in the range of 0.001 to 0.01 micrometers. The highly diffusive nature of particles in this size range favors their removal from the air space by deposition onto surfaces by molecular diffusion. The turbulent flow created by the fan facilitates such deposition. Air turbulence reduces the boundary layer thickness at the surface to air interface throughout a room and thus reduces the distance that unattached decay products must travel by molecular diffusion before depositing onto room surfaces. The net result is a higher flux of unattached decay products plating onto the walls of a room and a corresponding reduction in the airborne concentrations of such decay products. Enhanced surface deposition caused by turbulent convection becomes progressively less effective as particle size increases and is relatively unimportant for particle sizes greater than 0.1 micrometers.

As may be seen by the above, past efforts at particle control to reduce radon working levels suffer from two major defects: (1) most of the experimental work has been performed in uranium mines rather than in buildings (or test chambers that simulate buildings), and (2) studies of the effectiveness of control devices in buildings were not performed in a reproducible manner, so that optimal design and operation of air cleaning devices could be adequately devised.

DISCLOSURE OF THE INVENTION

In accordance with the present invention, the effective reduction of lung dose equivalent (The dose equivalent is a measure of the health effects of ionizing radiation, such as that produced by radon decay products.) due to airborne radon decay products within rooms of buildings is achieved by a tandem approach combining the two air treatment methods of (a) turbulent convection using a ceiling fan and (b) unipolar space charging employing an ion generator. Specifically, this tandem air treatment method is implemented by directly coupling an air ionizer with a ceiling fan. This type of tandem air treatment was investigated under carefully controlled laboratory conditions and was found to be superior to any other known method for reducing the dose equivalent to the tracheo-bronchial region of the lungs of people exposed to airborne naturally occurring radionuclides. Not only was the tandem air treatment superior, but it also exhibited a synergistic effect. The synergism of the two-step approach above outlined, is believed to come from the following. The addition of turbulent convection by the ceiling fan improves room air mixing, which allows the radon decay products and particles to which they attach, to become more rapidly charged. It also facilitates molecular diffusion to the room walls by reducing the thickness of the air boundary layer.

The air ionizer portion of the tandem treatment is particularly effective in reducing unattached and attached radon decay product concentrations. Mutual repulsion of air ions in the vicinity of a strong unipolar point source creates a spatial distribution of airborne charge and an electric field gradient directed radially from the source. Simultaneously, by the process of diffusion charging, decay product atoms, as well as airborne particles to which the decay products are attached, become charged to the polarity of the ion generator. The force exerted by the electric field on these charged particles causes their migration towards the boundaries of the air space, and this results in their deposition onto surfaces and their removal from the air.

BRIEF DESCRIPTION OF THE DRAWINGS

FIG. 1 is a perspective view of a preferred embodiment of the invention.

FIG. 2 is an enlarged view of an ion generator of the invention shown in FIG. 1.

FIG. 3 is an enlarged view of the individual elements 18 of the ion generator 12 shown in FIG. 2.

FIG. 4 is a schematic of the electrical connections for the system of FIG. 1.

FIG. 5 is a perspective of the apparatus of FIG. 1 shown in the environment of a walled living enclosure 80.

BEST MODE OF CARRYING OUT THE INVENTION

Referring to FIGS. 1, 2, 3, 4 and 5, a preferred embodiment of an air treatment system 10 for the removal of undesirable airborne radon decay products is shown to comprise, in general, an ion generator 12 integrally coupled with a ceiling fan 28. Ceiling fan 28 may be one of the many readily available ceiling fans having a centrally located light bulb socket 52 affixed to housing 30 (FIG. 4). A plurality of rotatable blades 14 rotate in response to an electric motor 56 (FIG. 4) located within housing 30. Support post 16 enables the fan 28 to be mounted on a ceiling of a walled living enclosure 80 (see FIG. 5) having dimensions suitable for human habitation and also provides a conduit within which electric wires run from the house electric supply i.e., A.C. power source 50 (FIG. 4) to the electric fan motor 56 and to the bulb socket 52 on housing 30.

A standard bulb-type screw-in electric fixture 26 is disposed at one end of ion generator 12 to enable the ion generator to be easily secured to or removed from housing 30 and electrically connected or disconnected from the A.C. power source 50 (See FIG. 4) in the premises. A high voltage D.C. power supply module 31 is affixed to the bulb fixture 26. The power supply 31 converts the 110 volts A.C. household power to a D.C. voltage of between 5–15 kV and therefore is well insulated.

In order to vary the air ion output rate of ion generator 12 and thus minimize excessive buildup of static electricity under changing environmental conditions (such as low humidity), a high voltage rheostat 34 is provided on the power supply. The rheostat is provided with a small adjustment knob or screw-driver turned shaft, accessible at the top of the ion generator 12. The rheostat permits variation of the D.C. voltage (in a well-known manner) through a range of about 5 to 15 kV to the ionizer electrodes 20. As an alternative, the rheostat might be mounted on the wall of the room housing the fan-ion generator combination.

A decorative globe 60 constructed of plexiglass, polycarbonate, glass or other suitable insulating material is attached to and encloses the power supply module 31. The outer surface of the globe is formed in a plurality of facets 70. Globe 60 simplifies mounting the ionizer electrodes 20 and gives a decorative appearance to the assembly. Facets 70 which house the electrodes 20 have bored recesses 18 so as not to interfere with ion production which occurs along much of the length of the electrodes 20. The inner surface 24 of the globe shell should consist of panels of polycarbonate oriented parallel to the plane of each matching facet 70 to serve as rigid anchors for the electrodes 20 protruding up through the bored recesses 18. Wires 22a and 22b connecting the ionizer electrodes 20 to the high voltage D.C. power supply 31 are routed through the interior of the globe and are well insulated to prevent electrical leakage.

The ionizer electrode 20 is constructed of tapered stainless steel with an approximate diameter of 0.2–1.0 mm at the base. The air ionizer electrode 20 can either be installed to be flush with, or protrude just above, the surface of the facet. The number of electrode sites on the globe 60 is variable and is based on the size of the globe and the dimensions of the room in which the device is to be used. A typical number of electrodes would range from a minimum of one to about ten. The electrodes are preferably spaced as equally apart as possible over the bottom half of the globe. Thus, most of the facets 70 would not contain ionizer electrodes 20.

The ion generator, as shown in FIG. 4, is preferably a positive (+) ion generator, in which the electrodes 20 are connected to the positive terminals of the D.C. power supply 31.

The air treatment system of the invention operates as follows. The fan 28 and ion generator 12 are preferably both energized and operated in tandem. For a room size of about 100 m$^3$ the fan should have a capacity of about 100–200 m$^3$min$^{-1}$. The turbulent convection caused by the ceiling fan facilitates molecular diffusion to the room walls. The positive (+) ion generator creates a strong positive ion point source. Mutual repulsion of air ions in the vicinity of this point source creates spatial distribution of airborne charges and an electrical field gradient directed radially from the source. At the same time, by the process known as diffusion charging, decay product atoms, as well as airborne particles (dust and the like) to which the decay products are attached, became charged to the polarity of the (+) ion generator. The force exerted by the electric field on these charged particles causes their migration toward the boundaries of the air space, i.e., the walls. This results in their deposition (plating) on the wall surfaces and removal from the air space. For a room of 100 m$^3$ volume, the output of ionizer in terms of air current should be about 1 to 1.5 microamperes at 30% relative humidity.

The improved performance observed with the air treatment system, above described, in comparison to existing methods of radon decay product removal is considerable. Although high efficiency filtration and electrostatic precipitation devices are capable of reducing indoor natural background radiation exposures, they both exhibit at least two serious disadvantages not found in the present method. Since contaminated room air must be drawn through a filter or electrostatic precipitator in order for the air to be cleared of decay products, it is essential that high volume air blowers be included as integral components of either device. Limiting factors in the effective air treatment these devices can provide are the air moving capacity or recirculation rate of the blower and the degree to which exiting clean air and contaminated room air mix. The high blower capacities required to treat even an average sized room are often associated with unacceptable noise and local air turbulence. The electrostatic precipitator, because of the associated corona discharge, is prone to unwanted ozone production. In contrast, the present treatment method emits no measurable amounts of ozone and is virtually silent during operation. Air turbulence produced by the ceiling fan used in the present treatment method is minimal since it is distributed over the entire room.

The second major shortcoming of filtration and electrostatic precipitation is that both types of air treatment have been shown to increase the fraction of unattached decay products remaining in the treated air. This in turn exacerbates the associated health hazards of the airborne material. This increase is in part caused by the limited air recirculation rates of these devices as compared to the short half-life of the first radon decay product, polonium-218, such that growth and decay of this radionuclide proceeds at rates much higher than the recirculation rate of the air cleaner. Contributing to this is the reduction of airborne dust concentrations brought about by the air cleaner and a corresponding lower probability that an unattached decay product will collide with a dust particle. The present air treatment system does not rely on an air recirculation rate and is capable of treating a larger volume of room air on a continuous basis. As a result, reduction of the polonium-218 concentration is more effective. The addition of turbulent convection by the ceiling fan improves room air mixing, which, as previously described, allows the radon decay products and associated particles to become rapidly charged. Turbulent convection also facilitates molecular diffusion to the room walls by reducing the thickness of the air boundary layer. It is for these reasons that it is believed that the present treatment system results in a synergistic removal of radon decay products and the related reduction in dose equivalent to the tracheo-bronchial region of the lungs.

The fact of synergistic dose equivalent reductions has been verified with controlled laboratory experiments. These tests were conducted in a 78.5 m$^3$ ventilated room into which flowed a constant supply of radon gas. The radon was introduced into the room by a floor mounted distribution manifold which ensured a homogenous concentration of radon and radon decay products throughout the room. Forced ventilation at prescribed air exchange rates was provided. A 130-cm-diameter ceiling fan[2] with two pre-set speeds and four paddle blades was used. The ceiling fan was suspended from the center of the chamber with respect to the walls. The specification for the mixing fan is given in Table I.

[2] Hunter Comfort Conditioning Division, Robbins and Myers, Inc., model 22306-7J, 2500 Fresno Avenue, Memphis, TN 39114.

TABLE I

| | MIXING FAN SPECIFICATION | | | |
|---|---|---|---|---|
| DEVICE | INDICATED FAN SETTING | AIR MOVEMENT (NEMA METHOD) (m$^3 \cdot$ min$^{-1}$) | ROTATIONAL SPEED (min$^{-1}$) | POWER CONSUMPTION (watts) |
| 130-cm CEILING FAN | HIGH | 198 | 200 | 155 |
| | LOW | 113 | 115 | 80 |

Two different types of commercial ion generators were used. The less sophisticated and less expensive unit[3], a negative ion generator, was designed for home/office use and was compact enough so that it could be placed on a desk top without taking up much space. The three ion emitting electrodes were placed along the top of the unit and recessed into the plastic case exterior. The ion generator was turned upside-down and suspended 1 meter down from the center of the ceiling.

[3] Ion Fountain II, Research Center, Inc., P.O. Box 905, Boulder Creek, CA 95006.

The second type of ion generation system tested was specifically designed for research applications and was capable of producing both negative and positive air ions[4]. The Air Care II unit consisted of a control module with dual negative and positive output and two stainless steel electrodes, each with a 30-ft connecting cable. The control module was mounted outside the test chamber while the electrode and cable were passed through the chamber wall and suspended 1 meter down from the center of the ceiling.

[4] Air Care II, model R-100, DEV Industries, 5721 Arapahoe Avenue, Boulder, CO 80303.

Both ion generators were continuously variable over their respective voltage ranges by rheostat control. Operating parameters and manufacturers' specifications are given in Table II below. For trials in which the ion generator and ceiling fan were operated simultaneously, the negative or positive ion generator was mounted 0.5 meter below the ceiling fan or 1 meter below the ceiling. An electrically insulated clamp was used to secure the ion generator to the stationary hub of the ceiling fan. Output of the ion generators was not influenced or hampered by the fan, regardless of whether or not the fan was operated. Ion generators were virtually silent during operation and produced no noticeable air movement.

TABLE II

SPECIFICATIONS FOR ION GENERATORS

| DEVICE (source) | OUTPUT VOLTAGE RANGE (kV) TESTED (kV) | ELECTRODE DIAMETER (cm) | ION OUTPUT RATINGS at 1 meter and 30% relative humidity (ions · cm$^{-3}$) | POWER CONSUMPTION (watts) |
|---|---|---|---|---|
| ION FOUNTAIN (Ion Research) | 3.0–15.0 15.0 | 0.050 | 10,000–540,000 540,000 | ≦2.0 2.0 |
| AIR CARE II (DEV Industries) | | | | |
| Positive Ions | 4.15–15.7 15.7 | 0.076 | 8,000–425,000 425,000 | 5–10 10 |
| Negative Ions | 3.85–15.8 15.8 | 0.076 | 11,000–425,000 425,000 | 5–10 10 |

The specifications given above were taken from the manufacturers' literature or through direct communication with a manufacturer's representative. Actual air ion outputs for the ion generators were found to vary substantially with relative humidity of the air and, to a lesser extent, the dust concentration in the room. A series of randomized experiments was conducted to measure the steady state reduction of airborne decay product concentration brought about by (a) an ion generator alone, (b) a ceiling fan, and (c) an ion generator combined with and operated simultaneously with a ceiling fan in accordance with the invention. The physical location within the room and operating parameters of each air treatment device remained fixed regardless of the combination or order of devices being tested. Testing on each air treatment method (a), (b) and (c) above, was repeated on four different days at two room air exchange rates, i.e., 0.2 and 0.5 h$^{-1}$. In addition to decay product concentrations, the fraction of decay products which was unattached to room aerosol particles was also measured. The ion generator was operated at both polarities so that any differences between negative and positive air ions could be evaluated with and without the ceiling fan.

The results of these experiments are tabulated in Table III below. The reduction of decay product concentrations was evaluated in terms of the Working Level (WL) unit. All table entries represent the mean values for that quantity. The percent of Working Level reductions are referenced to the Working Level obtained under baseline (i.e., no treatment) conditions.

TABLE III

SUMMARY OF ROOM MEASUREMENTS

| AIR TREATMENT | AIR EXCHANGE (h$^{-1}$) | UNATTACHED FRACTION ($f_p$) | WORKING LEVEL (WL) | WL REDUCTION (%) |
|---|---|---|---|---|
| Baseline | 0.2 | 0.025 | 0.2922 | — |
| Ceiling Fan | 0.2 | 0.047 | 0.1220 | 58.2 |
| Negative Ions | 0.2 | 0.594 | 0.0729 | 75.1 |
| Positive Ions | 0.2 | 0.441 | 0.0468 | 84.0 |
| (−) Ions and Fan | 0.2 | 0.403 | 0.0392 | 86.6 |
| (+) Ions and Fan | 0.2 | 0.389 | 0.0216 | 92.6 |
| Baseline | 0.5 | 0.035 | 0.0988 | — |
| Ceiling Fan | 0.5 | 0.024 | 0.0459 | 53.5 |
| Negative Ions | 0.5 | 0.350 | 0.0322 | 67.4 |
| Positive Ions | 0.5 | 0.243 | 0.0187 | 81.1 |
| (−) Ions and Fan | 0.5 | 0.178 | 0.0186 | 81.2 |
| (+) Ions and Fan | 0.5 | 0.170 | 0.0099 | 90.0 |

Two state-of-the-art lung dosimetric models were used to assess the dose equivalent reductions to the basal cell layer of the bronchial epithelium caused by each type of air treatment. These models are described in the following two references: [ICRP Publication 30, ICRP Committee 2: "Limits for Intakes of Radionuclides by Workers, Part 1", *Annals of ICRP*, 2, Pergamon Press, Oxford, (1979); Jacobi, W. and Eisfeld, K., "Dose to Tissues and Effective Dose Equivalent by Inhalation of Radon-222, Radon-220 and Their Short-Lived Daughters", GSF-S-626, Munich, Germany (1980)]. Using these models, we estimated the dose equivalent to the bronchial basal cell layer of the lungs based on measurements for the total and unattached fraction of the room Working Level. For purposes of calculating and comparing lung dose equivalents, it was assumed that the adult individual presumably exposed to this room environment spent 75% of the time indoors and had a mean breathing rate of 1.2 m$^3$h$^{-1}$. It was also assumed that the room aerosol had an aerodynamic median activity diameter between 0.2 and 0.3 micrometers. Under these exposure conditions, the mean dose equivalent to the target cells can be calculated from each of the lung model equations. The resulting data are given in Table IV,

TABLE IV

LUNG MODEL EQUATIONS USED TO ASSESS BASAL CELL LAYER DOSE EQUIVALENT

| LUNG MODEL | Dose Equivalent to Basal Cell Layer (Sv · WLM$^{-1}$)[5] |
|---|---|
| ICRP | 0.064 + 0.42 $f_p$ |
| JACOBI-EISFELD | 0.076 + 0.72 $f_p$ |

[5]The Sievert (Sv) is the unit of dose equivalent.

where: WLM (working level month) is defined as the exposure to a decay product concentration of one Working Level for 170 hrs and $f_p$ is defined as the fraction of the unattached Working Level.

To demonstrate the synergistic qualities of the ion generator and fan combination, it is first necessary to mathematically combine the individual dose reduction capabilities of the ion generator and ceiling fan and then to compare this result to the measured dose equivalent reduction when the two devices were operated together. The dose equivalent reduction efficiency of the ceiling fan alone, $R_f$, is defined as $$\left(1 - \frac{H_F}{H_B}\right),$$

where $H_F$ and $H_B$ are the annual dose equivalents (Sv yr$^{-1}$) for the room with ceiling fan and baseline air treatment, respectively. These quantities are calculated from the lung model equations in Table IV using the corresponding room measurements in Table III. Similarly, the dose equivalent reduction efficiency for the ion generator acting alone, $R_i$, is $$\left(1 - \frac{H_I}{H_B}\right),$$

where $H_I$ is the annual dose equivalent in the room when the ion generator is operated. To mathematically predict the dose reduction efficiency for simultaneous use of the ion generator and ceiling fan, the following reasoning was used: If the annual dose equivalent for baseline (no treatment) conditions is $H_B$, then the annual dose equivalent after employing a ceiling fan is $H_B(1-R_f)$. Now, if we assume this to be our "new" baseline dose equivalent, then when a second air treatment device, e.g., the ion generator, is added, we can expect, under the assumption of no synergistic action, that the resulting annual dose equivalent with the combination of devices ($H'_{IF}$) will be:

$$H'_{IF} = H_B(1-R_f)(1-R_i) \qquad (1)$$

which in terms of the expected dose equivalent reduction efficiency for the two devices acting together, $R'_{if}$ will be:

$$R'_{if} = 1 - (1-R_i)(1-R_f) \qquad (2)$$

The above relationship assumes no synergism resulting from combining the two air treatment devices and can be used along with the previous calculations for $R_i$ and $R_f$ to calculate $R'_{if}$. This value ($R'_{if}$) can then be compared to the true or observed $R_{if}$ obtained from the measurements when both air treatment units were operated. Should it be determined that $R_{if} > R'_{if}$ then a synergistic action would have been demonstrated. Conversely, when $R_{if} = R'_{if}$, no synergism exists and the two treatment devices merely act independent of one another. The final possible outcome is when $R_{if} < R'_{if}$ which means that the combined effect is somewhat antagonistic.

Table V summarizes the comparison of the predicted versus measured dose equivalents for the combined air treatment. These comparisons are presented for both lung models and for two room air exchange rates. It is clear that for the lower air exchange rate, 0.2 h$^{-1}$ and either polarity of the ion generator, the action of the combined treatment is synergistic ($R_{if} > R'_{if}$). Synergism is also apparent for the trials involving the negative ion generator and fan at a room air exchange rate of 0.5 h$^{-1}$. For the remaining air treatment trials, utilizing a positive ion generator and a fan at 0.5 h$^{-1}$, the devices appear to act independent of one another, or in this instance, strictly multiplicative as described in equation (2).

The reasons for synergistic action with the tandem air treatment devices were briefly explained above. The variations observed with the room air exchange rate and ion generator polarity require a more detailed explanation, in as far as our limited knowledge of the processes involved permits. The

TABLE V

PREDICTED VERSUS MEASURED RESULTS FOR ION GENERATOR AND FAN COMBINATION

| Air Change Rate (h$^{-1}$) | Ion Polarity | Lung Model | *Annual Dose Equivalent to Basal Cell Layer and Dose Equivalent Reduction | | | |
|---|---|---|---|---|---|---|
| | | | Predicted from Equations (1,2) | | Calculated from Room Measurements | |
| | | | H'$_{IF}$ (Sv) | R'$_{if}$** | H$_{IF}$ (Sv) | R$_{if}$** |
| 0.2 | — | ICRP | 0.395 | 0.529 | 0.353 | 0.580 |
| 0.2 | — | JACOBI | 0.693 | 0.346 | 0.554 | 0.477 |
| 0.5 | — | ICRP | 0.115 | 0.818 | 0.100 | 0.667 |
| 0.5 | — | JACOBI | 0.175 | 0.546 | 0.147 | 0.618 |
| 0.2 | + | ICRP | 0.211 | 0.749 | 0.189 | 0.775 |
| 0.2 | + | JACOBI | 0.347 | 0.673 | 0.297 | 0.720 |
| 0.5 | + | ICRP | 0.052 | 0.825 | 0.052 | 0.825 |
| 0.5 | + | JACOBI | 0.078 | 0.798 | 0.076 | 0.803 |
| 0.5 | + | JAMES | 0.170 | 0.689 | 0.179 | 0.673 |

*Assuming an occupancy factor of 0.75 or 38.6 WLM/Yr · WL.
**Fractional reduction efficiency.

diminished degree of synergism observed with higher room air exchange rates is believed to be due to two factors. The first is the increased steady state aerosol number concentration in the room, which is inherent with higher air exchange rates. The second factor is that higher air exchange rates also tend to enhance natural convection within the room and thus the incremental increase in air turbulence caused by the fan has a lesser effect. The enhanced natural convection also increases the natural wall deposition of unattached decay products. Both of these factors act to decrease the fraction of unattached decay products in the room. Since the ceiling fan is most effective in removing the unattached fraction, a lower unattached fraction in the room will reduce the available radioactive material that the fan can remove, thus reducing the effectiveness of the fan as an air cleaner.

The variation in synergism with ion generator polarity is due to the fact that the positive ion generator is more effective than negative ion air treatment in removing positively charged radon decay products in either an attached or unattached state. The reason for this difference may be due to the charge status of decay products, which normally exist as either positively charged (because of the stripping of orbital electrons during decay) or as neutral species. Those decay products which are positively charged, predominantly the unattached fraction, are already capable of being influenced by the electric field of a positive ion generator and therefore do not need to undergo diffusion charging to the same polarity as the generator prior to their removal. The net effect of this is that the positive ion generator's removal rate for unattached decay products will be greater which causes a lower steady state unattached fraction in the room. Any subsequent removal of attached decay products which occurs with the addition of the ceiling fan is less effective with positive ions and therefore the synergism is also diminished. As is apparent from the last entries in Table V, the combined effects of higher air exchange rates and positive ions virtually eliminated the synergism which was observed with all other trials.

The synergistic decay product removals observed at low air exchange rates is an extremely important and fortunate aspect of this disclosure. This is because the principal cause of elevated radon and radon decay product concentrations in residences is due to reduced outside air infiltration rates (largely the result of energy conservation measures), which permit radon to accumulate inside the dwelling. For this reason, it is believed that those home owners, who are most likely to have elevated radon and radon decay product concentrations in their homes, are also the ones that stand to benefit the most from the air treatment system of the present invention.

We claim:

1. In a walled living enclosure having an air space with radon decay products therein, the improvement comprising:
   (a) a positive ion generator means having an electrode for creating a spatial distribution of airborne positive ions in said air space and an electric field gradient directed radially from the generator means for causing migration of charged attached or unattached radon decay products toward the boundaries of the air space of said living enclosure where they deposit and are thereby removed from the air space;
   (b) an air circulating fan means having a plurality of paddle blades for causing turbulent convection of air in the air space to allow the radon decay products and particles to which they attach to become more rapidly charged and to facilitate molecular diffusion of particles and radon decay products; and
   (c) a power supply coupled to said positive ion generator means for supplying sufficient electrical power thereto to generate said positive ions without producing a substantial amount of ozone.

2. The enclosure of claim 1 in which the enclosure has a ceiling and the fan is suspended from the ceiling and the ion generator means is suspended from the fan.

3. The enclosure of claims 1 or 2 in which the ion generator means electrode is non-rotating.

4. In a walled living enclosure having an air space with radon decay products in the air space, the improvement comprising:
   (a) an air circulating fan having a plurality of blades and a motor rotating the blades for causing turbulent convection of air in the air space and;
   (b) a positive ion generator means having an electrode for creating a spatial distribution of airborne positive charges and an electric field gradient directed radially from the ion generator means;
   (c) said fan motor and ion generator means being electrically connected so as to operate in tandem; such that the simultaneous turbulent convection of air by the fan allows the radon decay products and particles to which they attach to become rapidly charged and facilitates molecular diffusion, thus causing migration of charged attached or unattached radon decay products toward the boundaries of the air space of said enclosure where they deposit and are thereby removed from the air space.

5. In a walled living enclosure having attached and unattached radon decay products, the improvement comprising:
   (a) an air circulating fan having a plurality of fan blades and a motor rotating the blades and enclosed in a housing for creating a flow of turbulent air in the air space;
   (b) a positive ion generator means depending from said housing;
   (c) said fan motor and ion generator means being electrically connected so as to operate in tandem; the turbulent convection of air by the fan thereby allowing the radon decay products and particles to which they attach to become rapidly charged and facilitating molecular diffusion of particles and radon decay products, while the ion generator means simultaneously creates a spatial distribution of airborne positive charges and an electric filed gradient directed radially from the ion generator means causing migration of charged attached or unattached radon decay products toward the boundaries of the air space of said enclosure where they deposit and are thereby removed from the air space.

6. A method of reducing the quantity of attached and unattached radon decay products in the air space of a walled living enclosure comprising:
   (a) circulating the air in the space by a fan;
   (b) concurrently generating positive ions from an electrode of an ion generator into the air space and creating a spatial distribution of airborne charged ions and an electric field gradient directed radially from the generator; whereby the turbulent convection of air in the air space allows the radon decay products and particles to which they attach to become rapidly charged and facilitates molecular diffusion of particles and radon decay products, and the electric field gradient causes migration of charged attached or unattached radon decay products toward the boundaries of the air space of said enclosure where they deposit and are thereby removed from the air space.

7. The method of claim 6 in which the number of ions generated per cubic centimeter is in the range of about 8000 to 425,000, as measured at 1 meter from the electrode at a relative humidity of 30%.

8. The method of claim 6 in which the fan includes blades which are rotated at a rate of about 100 to 200 revolutions per minute providing an air movement of about 100 to 200 m$^3$ min$^{-1}$.

9. Apparatus for reducing radon decay products in the air space of a walled living enclosure comprising:
   (a) a positive ion generator means having an electrode for creating a spatial distribution of airborne positive ions in said air space and an electric field gradient directed radially from the generator means causing migration of charged attached or unattached radon decay products toward the boundaries of the air space of said living enclosure where they deposit and are thereby removed from the air space;
   (b) an air circulating fan for causing turbulent convection of air in the air space to allow the radon decay products and particles to which they attach to become more rapidly charged and to facilitate molecular diffusion of particles and radon decay products;
   (c) and wherein the air circulating fan comprises fan blades and a fan motor within a housing which motor rotates the blades of the fan; and a bulb socket depending from said housing; and
   (d) the ion generator means comprises a unitary assembly of:
      (i) a bulb fixture for attachment to said bulb socket;
      (ii) a D.C. power supply for generating sufficient D.C. voltage to discharge ions from an electrode;

(iii) and the electrode comprises a plurality of needle-like conductors radially extending from the assembly into the air space;

and wherein the ion generator means is attached to said fan by coupling said bulb fixture to the bulb socket of the fan housing.

10. Apparatus for reducing attached and unattached radon decay products in the air space of a walled living enclosure comprising:

(a) an air circulating fan having a housing enclosing a fan motor and adapted to be mounted on a ceiling;

(b) a positive ion generator means comprising a D.C. power supply for generating a D.C. voltage of about 5–15 kV and a plurality of electrodes coupled to said power supply for generating positive airborne charges, said ion generator means centrally depending from said housing and non-rotatably affixed thereto, and wherein the electrodes are partially enclosed in a multi-faceted globe by a bulb fixture;

(c) said fan motor and ion generator means being electrically connected so as to operate in tandem; whereby turbulent convection of air by the air circulating fan allows the radon decay products and particles to which they attach to become rapidly charged and facilitates molecular diffusion of particles and radon decay products, while the ion generator means creates a spatial distribution of said positive airborne charge and an electric field gradient directed radially from the generator causing migration of charged attached or unattached radon decay products toward the boundaries of the air space of said enclosure where they become attached and are thereby removed from the air space.

* * * * *